(12) United States Patent
Durham

(10) Patent No.: US 12,430,529 B2
(45) Date of Patent: Sep. 30, 2025

(54) QR CODE FOR INFORMATION TRANSFER RELATED TO AN ARTICLE, ITEM OR PRODUCT

(71) Applicant: Jaquial Durham, Lanham, MD (US)

(72) Inventor: Jaquial Durham, Lanham, MD (US)

( * ) Notice: Subject to any disclaimer, the term of this patent is extended or adjusted under 35 U.S.C. 154(b) by 0 days.

(21) Appl. No.: 18/554,413

(22) PCT Filed: Apr. 7, 2022

(86) PCT No.: PCT/US2022/071606
§ 371 (c)(1),
(2) Date: Oct. 6, 2023

(87) PCT Pub. No.: WO2022/217261
PCT Pub. Date: Oct. 13, 2022

(65) Prior Publication Data
US 2024/0232560 A1     Jul. 11, 2024

(51) Int. Cl.
| | |
|---|---|
| *G06K 19/06* | (2006.01) |
| *G06F 16/955* | (2019.01) |
| *G06Q 10/087* | (2023.01) |
| *G06Q 30/018* | (2023.01) |

(52) U.S. Cl.
CPC ... *G06K 19/06037* (2013.01); *G06F 16/9554* (2019.01); *G06K 19/06103* (2013.01); *G06Q 10/087* (2013.01); *G06Q 30/0185* (2013.01)

(58) Field of Classification Search
CPC .......... G06K 7/1417; G06K 19/06037; G06K 19/06103; G06K 19/06009; G06F 16/9554; G06Q 10/087; G06Q 30/0185
USPC ................ 235/494, 462.01, 462.09
See application file for complete search history.

(56) References Cited

U.S. PATENT DOCUMENTS

| | | | |
|---|---|---|---|
| 8,027,889 B1 * | 9/2011 | Maroney ................ | G06Q 40/12 705/26.61 |
| 2005/0251456 A1 * | 11/2005 | Perkowski ......... | G06Q 30/0625 705/26.62 |
| 2007/0050712 A1 * | 3/2007 | Hull ..................... | G06F 40/106 715/234 |
| 2012/0085829 A1 * | 4/2012 | Ziegler .................... | G09F 3/14 235/487 |

(Continued)

FOREIGN PATENT DOCUMENTS

EP        2701099     *  2/2014   ............. G06Q 30/06

Primary Examiner — Daniel St. Cyr
(74) Attorney, Agent, or Firm — Kearney, McWilliams & Davis, PLLC; William Yarbrough

(57) ABSTRACT

The present invention relates generally to a QR code for an item, article, or product supplying source identification and product availability, confirmation of authenticity, details of manufacture, retrieval of specific data, as well as determination of access wherein all data is related to words or images displayed upon a specific article through a scanner-enabled smartphone and internet connection. Specifically, the QR code that is the present invention is directed toward identification, authentication, and relaying of information describing or expanding upon words or images displayed on an article of clothing or garment, items or products wherein a QR code reader, smart phone enabled or otherwise, may be used to scan said QR code in order to supply the reader with information specific to said article, items or products, depictions on said article, item or product, or for event or area admittance.

15 Claims, 6 Drawing Sheets

(56) References Cited

U.S. PATENT DOCUMENTS

| | | | |
|---|---|---|---|
| 2012/0325906 A1* | 12/2012 | Rathus | G06Q 30/0251 |
| | | | 977/774 |
| 2020/0125907 A1* | 4/2020 | Sheth | G06F 40/284 |
| 2020/0151528 A1* | 5/2020 | Chen | G06K 19/06056 |
| 2020/0294634 A1* | 9/2020 | Katz | G16H 50/30 |

* cited by examiner

QR CODE FOR INFORMATION TRANSFER RELATED TO AN ARTICLE, ITEM OR PRODUCT

CROSS-REFERENCE TO RELATED APPLICATIONS

U.S. Provisional Patent Application No. 63/171,627 filed Apr. 7, 2021 PCT International Patent Application No. PCT/US22/71606 filed Apr. 7, 2022

FEDERALLY SPONSORED RESEARCH OR DEVELOPMENT

Not Applicable

INCORPORATION BY REFERENCE OF MATERIAL SUBMITTED ON A COMPACT DISK

Not Applicable

FIELD OF THE INVENTION

The present invention relates generally to a QR code system and method of use for: (1) identification of a product's sourcing, identification of materials of manufacture and manufacture conditions and location, (2) tracking, tracing and inventory; (3) product authenticity verification; (4) facilitated consumer purchasing; and (5) retrieval of specific data related to articles, items or products and/or words or images displayed upon a specific article of apparel, products or clothing. Specifically, the QR code system that defines the present invention is directed toward identification, authentication, and relaying of information describing or expounding and expanding upon an article, words and/or images displayed on an article, item, or product wherein a QR code reader/scanner may be used to read/scan a QR Code in order to supply the receiver with information specific to said article, item or product in terms of origin, production, availability for purchase, and information or data related specifically to images depicted on said article, item or product; thus merging physical articles, items, and products with a virtual reality's unlimited and mutable digital data supply and content.

BACKGROUND

The first use of QR (Quick Response) codes, "matrix barcodes" or "matrix codes" can be traced to the automotive industry, specifically the Japanese automotive industry and Denso Wave®, as early as 1994, as a means to quickly and efficiently track automobile parts within a production facility. As opposed to UPC barcodes (i.e., Universal Product Codes), two-dimensional QR codes use a series of square groups of small opaque "cells" against a white background to enhance scanability and to vastly increase the amount of data available for scanning, up to 3 Kb, for a single code. The conventional two-dimensional QR code itself consists of 177 rows and 177columns, horizontally and vertically, which may be made to including from hundreds up to thousands of characters including 2,509 numeric characters or 1,520 alpha-numeric characters (including up to 7089 digits or 4296 overall characters). Conversely, a UPC one dimensional code is a single plane, one-dimensional bar code, which stores data in linear, parallel lines that may vary in width and spacing ranging from 43 to 85 characters or combinations, typically using 12 accompanying numbers, which severely limits its data capacity and thus its utility.

Possibly the most recognizable QR code in the public sphere is the Aztec Code (U.S. Pat. No. 5,591,956 issued to Longacre and subsequently dedicated to the public) duly named for the resemblance to its central finder pattern to an Aztec pyramid. The Aztec Code is particularly useful for its absence of or minimal dependance upon a "quite zone", in opposite of UPC bar codes, which are required to be of a specific length and ratio (ten times the dimension of the narrowest element in the barcode) in one-dimensional barcodes to indicate to the reader when to start and when to stop reading/scanning. The QR code itself is constructed around a centrally disposed "bulls-eye" wherein data is encoded in concentrically arranged squares residing around the "bull's eye", or like centrally located squares. Equally, the "bull's-eye" may retain value as an area of display for text, symbols, diagrams, designs, trademarks, logos, words, word marks, service marks, artwork, and the like, or a combination thereof, made to display branding (i.e., marketing, promotional, advertising, legal, sweepstakes, or contest information), signifiers, or other identifying indicia.

More than simply a tag or 'barcode', the Aztec Code is particularly well-suited to information stored for "hard linking" due to compact size (executing operations without "quite zones"), ability to convey a large amount of data, ability to connect to the internet (via a scanner-enabled smartphone) for information retrieval, as well as for identity, authentication and tracking, incorporating orientation marks for scanning even when rotated, angled or reflected—adding to the overall robustness of the Aztec Codes, specifically, and QR codes generally.

Advantageously, QR codes can contain much more data, including item-specific data related to an article's, item's or product's particular QR code on a per item basis. In opposite, one-dimensional codes commonly track and label items in a manner where all items in a set display identical barcodes, disallowing individual identification and tracking. This creates logistical issues if barcodes are utilized to track items individually within a set or if data needs to become attached or assigned to a certain code or set of codes. On the contrary, QR codes can be used to give a unique identity across identical items in a set. Moreover, QR codes can be read from practically any direction and angle, top, bottom, left or right, making them much easier and quicker to scan than their one-dimensional counterparts. This expediated scan correspondingly gives rise to the term and name "quick response" code.

Additionally, due to inherent error correction capabilities fundamental in QR codes, QR codes offer superior robustness against dirt and wear. So, even if a QR code becomes old or worn with use, the code itself contains structural data keys containing redundancies and duplications, wherein the capability of successfully being scanned is not greatly diminished (as opposed to a one-dimensional barcode) over time. This is especially important when it comes to apparel, or items existing in similarly harsh environments, as these articles tend to experience excessive wear and tear throughout their lifetime, as will the accompanying QR Code tags. Therefore, the use of QR Codes becomes ideal for enhancing both flexibility in use and robustness with continued use over the lifetime of the tagged item.

Further, internet-enabled mobile devices, and accompanying scanning capabilities, have become so omnipresent as to allow for an extremely wide acceptance and use of QR codes and their integration into popular use the world over. In as early as 2002, Sharp Corp. introduced the first QR code reader within a cellular mobile device which has undergone practically universal acceptance among smart device manufacturers and users. Fast-forwarding to present day, with 3 billion smartphones (and counting) in circulation worldwide, roughly 1.38 billion cellphones distributed in 2020 alone, the penetration rate in industrialized countries signifies an omnipresence that is undeniable. Pointedly, in 2016, less than half of the world's population owned a smart device, but the smartphone penetration rate has continued climbing, reaching 78 percent in 2020. And, by 2025, it is forecast that almost 87 percent of all mobile users in the United States will own a smartphone. This prevalence makes the current invention highly operationally attractive, utilitarian, and accessible by virtually anyone having a smartphone with QR code reading capacity—which is growing to be the majority of devices.

Also, given the fact that the rights to use the QR code itself was dedicated to the public, the ubiquitous use and adoption of these codes has undergone few barriers to incorporation into everyday use, the least of which being the conformity of personalized data retrieval and consumption where codes are highly accessible and require no direct contact with foreign surfaces. This constitutes an advantage until recently underappreciated until contact with fomites has been highlighted as a viable feature in disease transmission, infection, and potential resultant sequalae.

Most pertinent to the present invention and disclosure though, through a primary and critically evidenced feature, is the usefulness of QR codes and aforementioned scanning capability across such a wide swath of the consuming public allowing consumers of data and information to "hardlink" or "object hyperlink" a physical object to a virtual space on the internet via a URL or mobile application link. This aspect of tying a physical marker or indicator to a wider source of "virtual" information is especially crucial to the present invention in that even the greatly expanded data capabilities of QR codes is increased exponentially through a virtually limitless supply of data via linking to the internet. Such input may be accessed for information specific to an item (i.e., a "ingredients" tag, source identifying data, manufacturing data, purchasing data and the like), authenticity data, sourcing data (e.g., responsibly sourced goods), retail availability and location information, historical background information, societal commentary, community information, activist information, political discourse, discount, coupon and banking information as well as social media, website and or application direction. Furthermore, information may be linked or linkable to symbols, characters, words, logos, trademarks, or artwork displayed on an item though access to a social media platform or webpage. In addition, a presented QR code may be linked or linkable to ticketing and admission (and/or information allowing access to a restricted space) where initial and secondary access is made available to a presenting individual for admittance to an event and/or subsequent admittance to a separate space within that same even (ex. VIP or meet and greet). Expressly, QR codes are modifiable at the level of information retrieval wherein, if QR code information directs a user or consumer to a website or mobile application, the website, directly or through conjunction with a mobile application, is infinitely editable and updatable as to keep information content pertinent and informative.

Currently, inventor would argue, the second phase of an apparel revolution where the remediation of certain 'tag' deficiencies is achievable to maximize the beneficial attributes of basic tagging (e.g., identification, pricing and inventory of each type of item) and expanding into (a) identifying and authenticating a singular piece of apparel and (b) connecting each single piece to the IoT, IoP and (IoE) for tracking, identification, authentication, purchasing and information gathering specific to said each single piece, item or product. Too, the same QR code or additionally applied QR codes may be configured to allow (or disallow) access to a venue and/or an otherwise restricted area, particularized limited edition availability, arcane information, discounts, coupons, scheduling information, pop-up events, or any other information a producer or manufacturer wishes to share with a vendor or consumer. Pointedly, the information made available to a consumer may be different from the information available to a vendor although each contained in the confines of a single or multiple QR codes wherein one to a plurality of mobile applications may be accessible by different principals and supply each one different content, different levels of content, different functionalities, and differing capabilities. Distinctly, a single QR code may offer tracking and inventory data accessibility to a vendor or retailer and access to content related to the sourcing, manufacture, retail availability, background, access and/or access to funds to a consumer, for example. Moreover, certain QR code features may provide information, or access to information, specific to a distributor, different information to a retailer and still different information to a consumer, all within a single QR code, whereby each disparate party may be granted access to distinct and separate URLs commanding independent verification codes by which to access pertinent information. In this way, a single QR code may afford all parties involved in all transactions information strictly relevant and material to their individual operations, level of consumption, desired interest, and the like. And, to the extent that information may be partitioned into categories and made accessible upon credentialling, the QR code is multifunctional serving the needs and requirements of each participant, collectively and individually.

And while it is undisputed that traditional one-dimensional UPC barcodes have proven essential for tracking, monitoring, and pricing items, these same codes are limited in terms of effectiveness when an individual piece or item is required to be identified, authenticated, or probed for additional information (as above). A single QR code is immeasurably more attractive for it's ability to provide several concomitant "layered" functions or simply an individual's access to restricted areas and information as desired to be monitored, allowed or prohibited.

Far and away from mere contactless conveyances of information, brought about by communicable diseases, the present use of QR code technology is used to leverage dynamically curated QR codes as a portal into a novel and burgeoning space to introduce consumers to an expanded and supplemental way to experience products and services.

Thus, there is a significant and well recognized, and yet unmet, need in the art for an item to be easily scannable and readable, in this case an item, article, garment, or piece of apparel displaying a QR code, allowing for supplementation of information directly related to the article, item, or product or directly to images or symbols displayed on a specific garment or apparel piece itself. What is more, where a code exhibiting several functions efficiently and ergonomically (e.g., informational, inventory and access) is desired—the present invention satisfies this long-standing need in the art to address such deficiencies.

It is therefore inventor's goal to remediate the infirmities of one dimensional bar codes in terms of the ability to encompass and convey large amounts of informational and tracking data on a platform that is equally hearty and robust, in particular, specific to an article, item, product or wearer, whereby said information can convey detailed descriptions of an article, images displayed on that article and/or information specific to the utilizer of said article, item or product in a frictionless transaction spanning the gap between tangible and virtual as described above.

BRIEF SUMMARY OF THE INVENTION

The present disclosure provides a new and novel method for supplying consumers with data and information, via a QR code and scanner-enabled, internet accessible smart phone, directly related to an image on an item or piece of apparel/garment or involving the specific garment itself including identification, authentication, supplemental information and/or authorizations (i.e., in the form of ticketed access to a venue or area). And, where specific information is supplied, that information may be accessed through any mobile smartphone, via direction to a URL or mobile application, which is equipped with a QR scanner or "reader" whereby information retrieval is achieved through connection, through said smartphone, to the internet.

It is therefore the stated goal of the present invention to allow a manufacturer, producer distributor, retailer, purchaser, consumer, or other interested party, to scan a QR code to receive data and/or information related directly to either a garment or images displayed on a garment, item or product including, but not limited to, historical information, future owners, chain of title, manufacturing information, production information, distribution information, tracking information and authenticity (genuine article) information. In addition, the same QR code may be utilized to provide the wearers ability to access a restricted area (e.g., as a concert or event ticket or an area within a concert or event or venue), whereby the wearer may be able to simultaneously project identifying, authenticating, informational and access information from a single QR code source or multiple codes, simultaneously. As well, inventor contemplates applications of the present invention in the metaverse, or other virtual platforms/alternative realities, wherein the aforementioned QR code may be used to access information as to provide "virtual wear" or "virtual products" to a representation or avatar mimicking a physical QR code tagged example.

The code itself is comprised of several "zones" including positioning detectors, alignment markers, timing patterns, version information, format information, data/correction keys, darkened areas, as well as quiet zones—white space supporting opaque zones. In order, positioning detection markers allows a scanner to both recognize a code, in a relatively short amount of time, and to establish the direction in which the code is displayed (oriented). Alignment markers, less prevalent than positioning detection markers, assist in "straightening" QR codes and allowing them to be read on a curved surface. Timing patterns are used to configure the data grid and aids in "telling" the scanner how much data is being presented. With approximately 40 different QR versions currently available, version markers designate which version is currently applicable (informing the reader/scanner) as to the specific "language" being used. Data and error correction keys supply essential robustness to the QR code itself thus allowing a certain percentage of data to be unreadable or damaged while still conveying the necessary information to the scanner. Finally, all darkened (opaque) areas, above, would not be detectable or discernable by a scanner without the "quiet" or "white space" elements which allows the other determinative elements to be perceived and processed.

This brings us to the understanding of static and dynamic codes wherein static codes are immutable, fixed, and unchangeable. These are particularly useful for badges, employee IDs, and equipment tags where information is not anticipated to change. Conversely, dynamic codes (i.e., those codes allowing metrics tracking or post creation editing) permit the code producer to update, edit, and change the type of the QR code infinitum. Where static QR codes only expand in size and complexity with additional information inclusion, dynamic QR codes contain only that information necessary for a truncated conveyance to a specific URL, through an integrated or downloadable smartphone feature or application and/or to an accessible URL webpage. Discretely, this may allow a user to be directed either directly to a webpage or to an "app store," wherein a user may then access information through said mobile downloadable application. This allows a dynamic QR code to remain smaller and more manageable and thus able to impart multitudes of data via a smart phone mobile application/reader/scanner, to create bulletins or fliers for event marketing and promotion that are immediately downloadable or sharable, directly through a messenger application or via a social media platform (e.g., Twitter®, Facebook®, Instagram®), to access moving images and videos and share via direct contact (as above) or video streaming platforms (TikTok®, YouTube®, Vimeo®, Vivo®), to generate coupons, promotions, and/or exclusive content, and even direct a user to a website, contact information, brick and mortar store locations, or to supply hours and/or locations, as well as directions to the retailer.

And while the invention itself and method of use are amendable to various modifications and alternative configurations, specific embodiments thereof have been shown by way of example in the drawings and are herein described in adequate detail to teach those having skill in the art how to make and practice the same. It should, however, be understood that the above description and preferred embodiments disclosed, are not intended to limit the invention to the particular embodiment disclosed, but on the contrary, the invention disclosure is intended to cover all modifications, alternatives, and equivalents falling within the spirit and scope of the invention as defined within the claim's broadest reasonable interpretation consistent with the specification.

BRIEF DESCRIPTION OF THE DRAWINGS

While the novel features and method of use of the application are set forth above, the application itself, as well as a preferred mode of use, and advantages thereof, will best be understood by referencing to the following detailed description when read in conjunction with the accompanying drawings in view of the appended claims, wherein:

Figure 6:
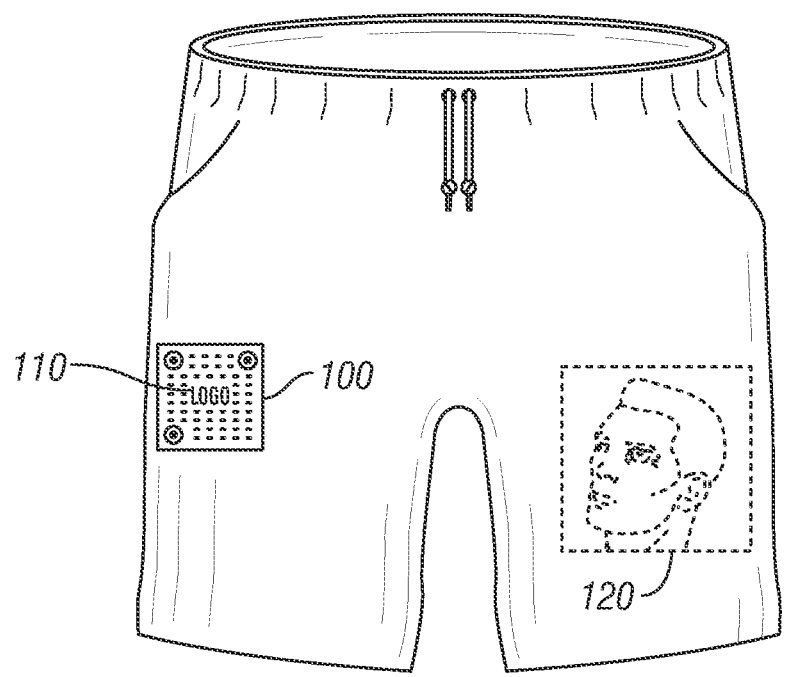

FIG. 6 illustrates yet another preferred embodiment of the present invention with a depiction on the wearers left thigh and a QR code on wearers right thigh.

And while the invention and method of use are amendable to various modifications and alternative configurations, specific embodiments thereof have been shown by way of example in the drawings and are herein described in adequate detail to teach those having skill in the art how to make and practice the present invention. It should, however, be understood that the above description and preferred embodiments, are not intended to limit the invention to the particular embodiment disclosed, contrarywise, the invention disclosure is intended to cover all modifications, alternatives and equivalents falling within the spirit and scope of the invention as defined within the claim's broadest reasonable interpretation consistent with the specification.

DETAILED DESCRIPTION OF THE INVENTION

While advantages of the present invention will be readily apparent to those having skill in the art based on the appended description, there are described certain embodiments, permutations, and versions constituting the present invention and examples for illustrative purposes. And, although the following detailed description contains many specific references to different embodiments, one having skill in the art will certainly appreciate that modifications, alterations, and variations are within the scope of the present invention. Accordingly, the following examples of the invention are set forth without any loss of generality to, and without imposing limitations upon, the claimed invention. While structures and configurations are elucidated in connection with the description herein, there is no intent to limit the scope to the embodiments disclosed herein. On the contrary, the intent is to cover all equivalents.

Equally, it should be observed that the present invention can be understood, in terms of both structure and function, from the accompanying disclosure, diagrams and claims, taken in context with the associated drawings. And whereas the present invention and method of use are capable of several different embodiments, which can be arranged and rearranged into several configurations, each may exhibit accompanying interchangeable functionalities without departing from the scope and spirit of the present application as shown and described.

The present invention provides a QR code 100 in FIG. 1 through FIG. 6 evidencing a combination product identifier (depiction 120), a logo 130, serving as a means of displaying a depiction 120 or image, and equally as an authenticator and tracker, though QR code 100, that additionally provides information for consumer purchasing, products origin, product descriptions, product parameters, as well as the wearers ability to enter and access certain restricted spaces. Accordingly, the present invention evidences a scannable QR code 100, accessed via a scanner-enabled mobile device or other reader (not shown), to provide the above-mentioned information to a manufacturer, distributor, retailer, consumer, user, observer, or another third party desiring to access such data or information. The information may be directed to (a) an item's provenance; (b) inventory and tracking information,, (c) authenticity; (d) descriptive information pertaining to a person, symbol, depiction 120 or event displayed on an item, article or product (e.g., a historical figure, a branded logo or trademark, or a concert or sporting event, current or historical, for example); (e) access to a space or event; (f) direction to access to a space within that space or event; (g) billing or currency information; (h) access to a specific section or "page" on a social media platform; (i) access to a URL; (j) access to a mobile device application; and/or (k) access any other platform for information retrieval. It is within inventor's prevue that these activities may occur sequentially or simultaneously whereby information may be historical, real-time, or a combination thereof.

What is more, the QR Code 100 itself may incorporate a word, symbol, logo, custom design, trademark, or other artwork, and the like, into the "bulls-eye" or center 110 of QR code 100 as to further distinguish an item or product visually through brand identification.

Figure 1:
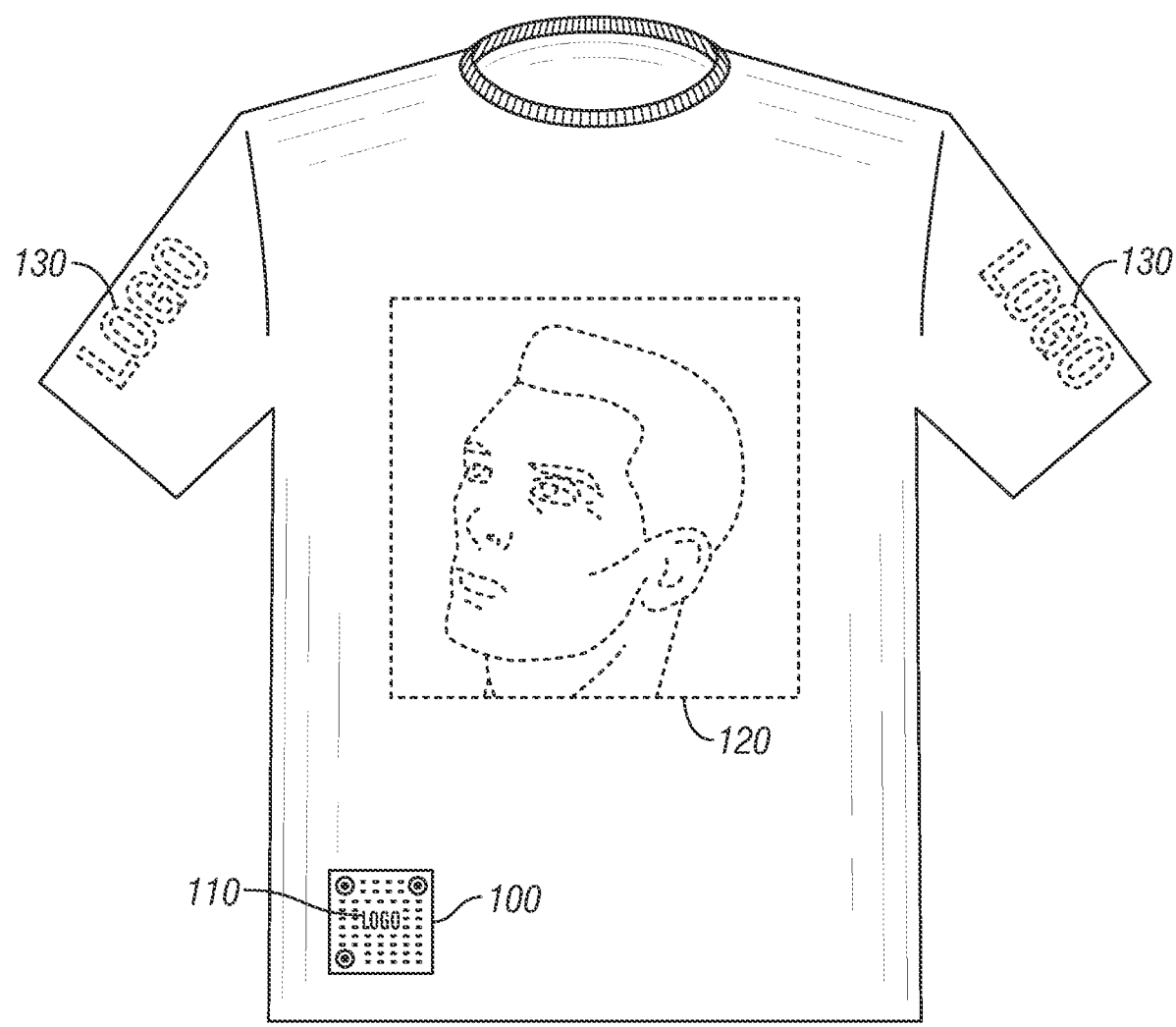
FIG. 1 depicts a t-shirt with an embossed depiction, centrally, and a QR code adhered to wearers bottom right exterior edge.
Figure 2:
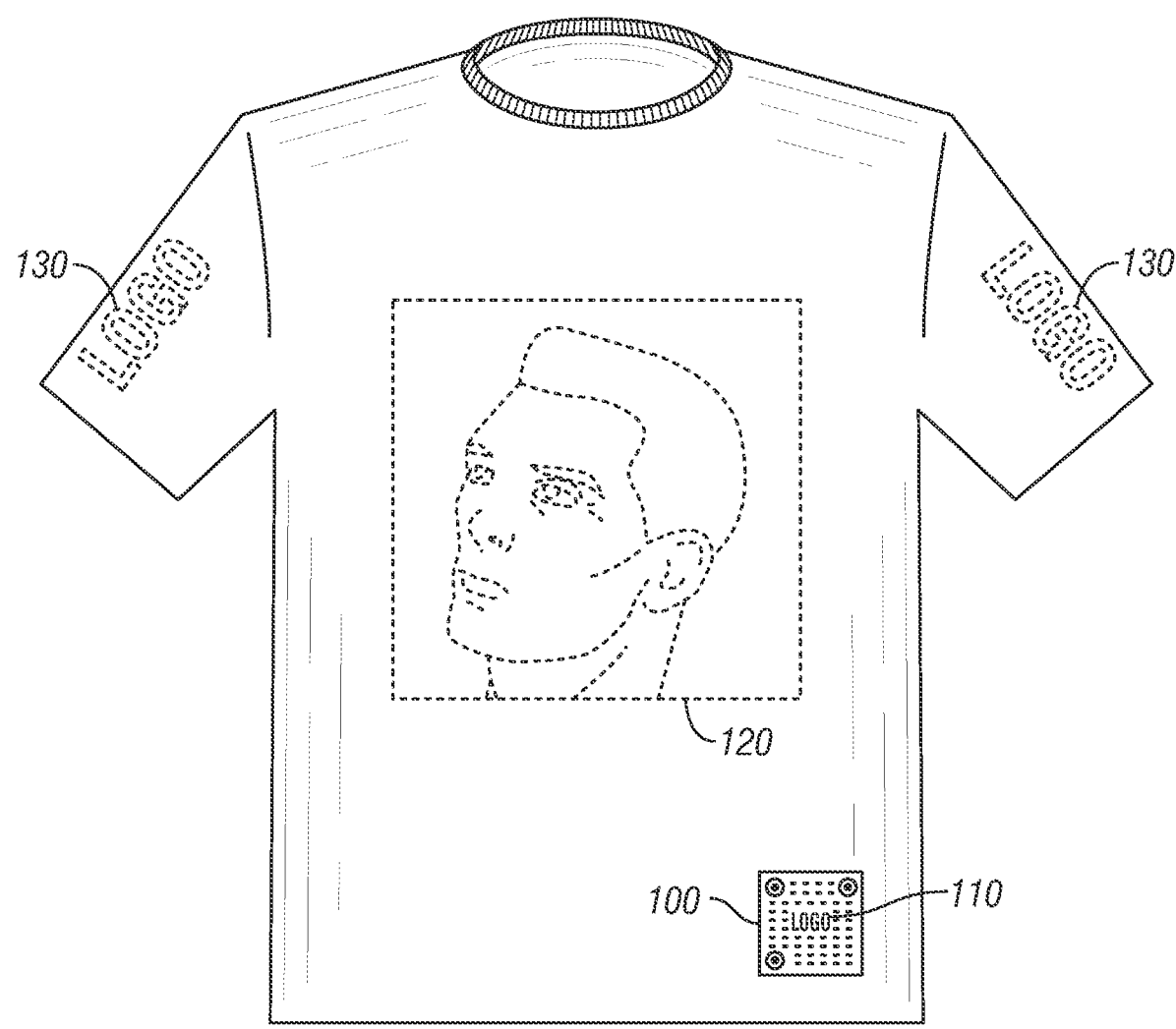
FIG. 2 illustrates the present invention with an embossed depiction, centrally, and a QR code adhered to wearers bottom left exterior edge.
Figure 3:
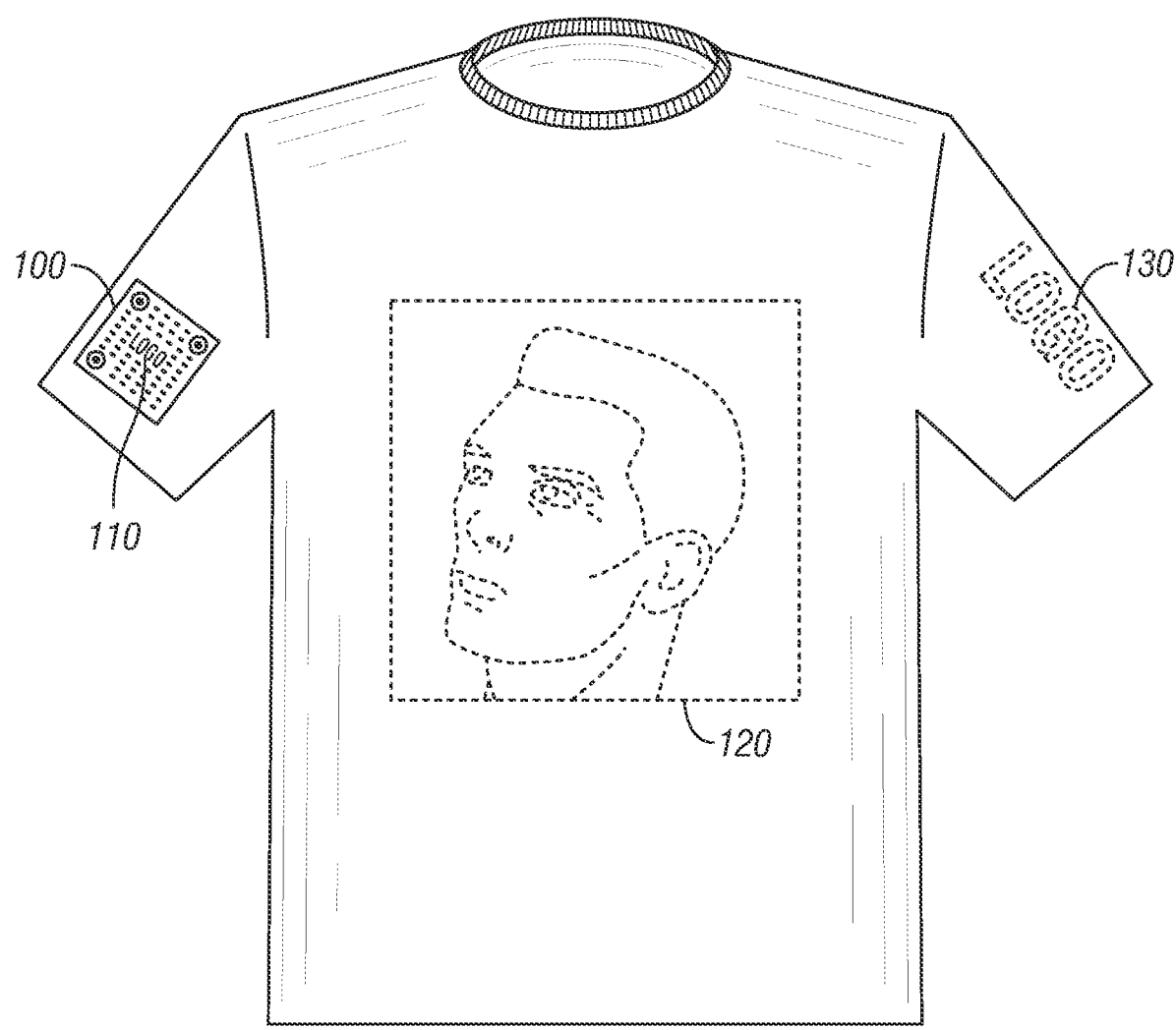
FIG. 3 is the present invention providing a t-shirt with an imprinted depiction and QR on the wearers right sleeve.
Figure 4:
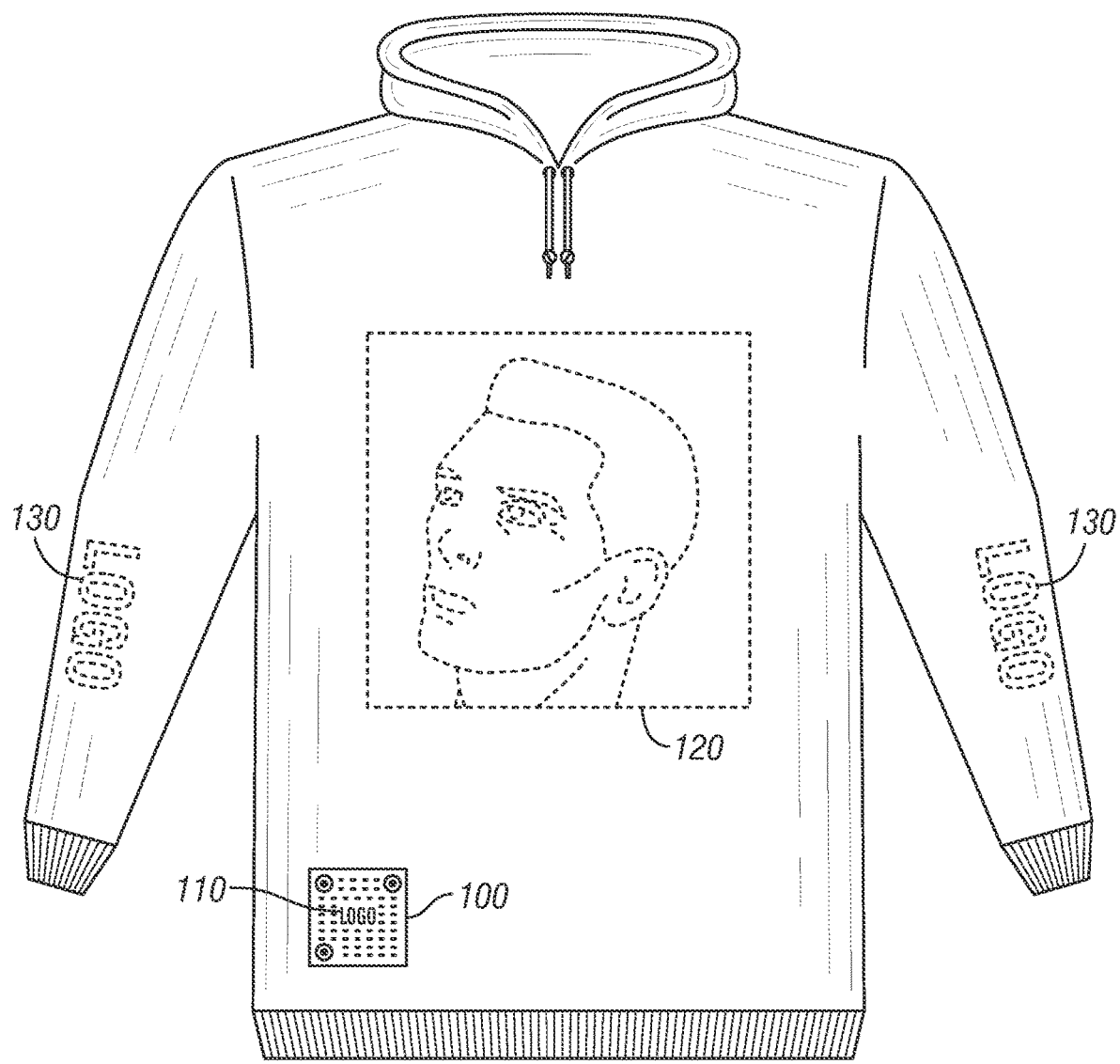
FIG. 4 Illustrates a hoodie with an imprinted depicted illustration and a QR code in wearers' garment's bottom right corner.
Figure 5:
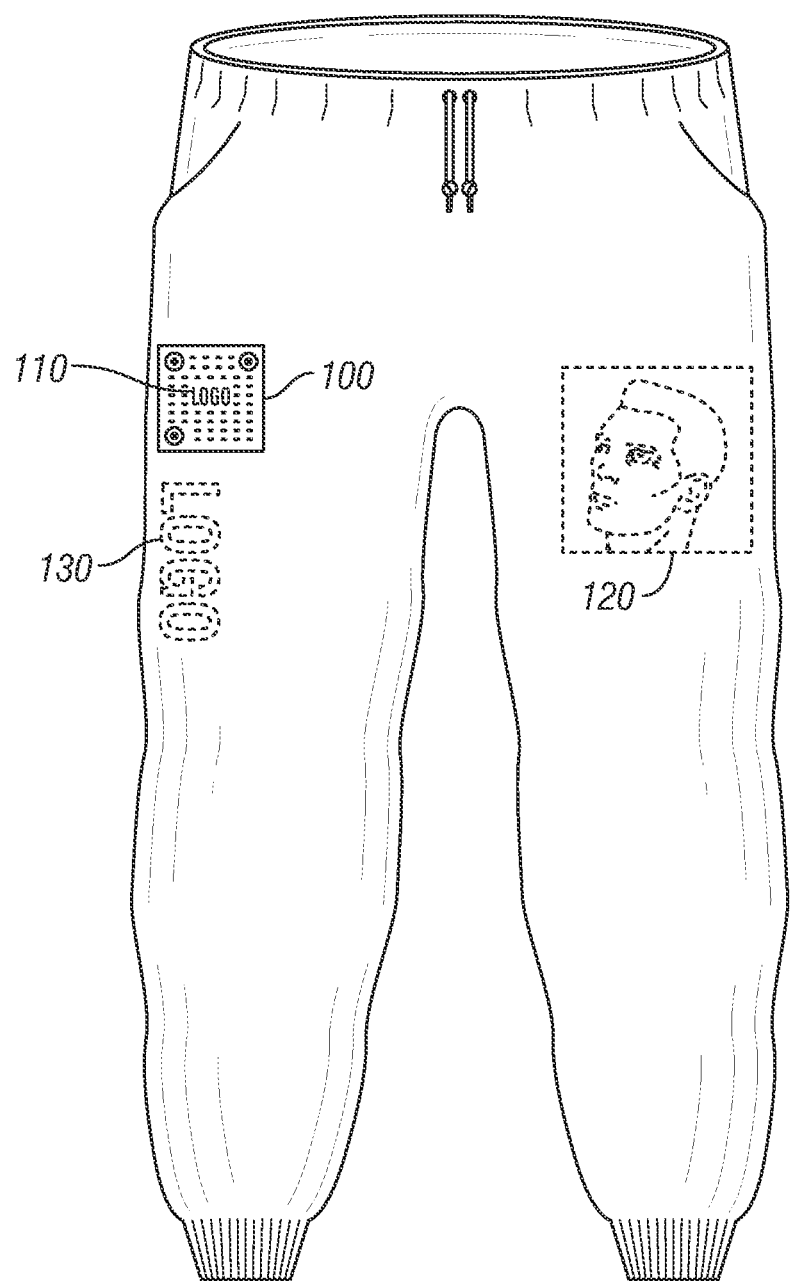
FIG. 5 depicts another preferred embodiment of the present invention on a pair of sweat pants with a logo/ depiction on wearers left thigh, a QR code on wearers right thigh and an additional word logo on wearers lower right thigh.

The invention that is the subject of the present application is presented representationally in FIGS. 1 through 6 on various articles of clothing, t-shirts in FIGS. 1-3, a hoodie/sweatshirt in FIG. 4, sweatpants in FIG. 5 and sweatpants in FIG. 6, wherein the QR code 100, or potentially multiple QR codes, have incorporated in them a sports team logo, brand logo, company logo, symbol, trademark, symbol, and the like.

QR code 100, wherein said QR code 100 or multiple QR codes have incorporated in them a sports team logo, may further be applied to any article (not shown), as in the contemplation of inventor as spanning any article, item, or product that capable of accepting a mark, logo, symbol or trademark or is relatively flat or uniformly amendable to logo, symbol or trademark adherence that affords a suitable surface for QR code adhesion. This includes, but is not limited to, drinkware, koozies, flags, hats, gloves, jackets, shoes, posters, signs, displays, windows, doors, phone cases, computer cases, bags, purses, briefcases, computer cases, binders, folders, album covers, album jackets and the like.

Preferred Embodiments

In one preferred embodiment, the present invention consists of a QR code for the tracking, monitoring, tracing, and inventorying of items or products including: t-shirts, shoes, hats, jackets, sweatshirts, vests, socks, or other apparel and related garments. This invention may also extend to other non-apparel items or products including: signage, banners, flags, drinkware, phone cases, backpacks, and other viable apparel, in addition to tradeshow, marketing, or various concert merchandise and the like.

In another preferred embodiment, an article, item, or product may be made to exhibit one to a plurality of QR codes, of various sizes and configuration, wherein each code may convey the same, different, additional, corresponding, supplemental, and/or primary and secondary information. For example, a primary QR code may provide information specific to source, origin, materials of manufacture, while a secondary QR code may provide information specific for inventory, tracking and tracing. Further, a supplemental QR code may provide information related to a brand, website, or multiverse (digital twin) designated areas for expanded consumer access to brand or image specific information and data.

In another embodiment, an article, item, or product may be made to exhibit one QR code, displaying of various sizes and configurations of requisite indicia, wherein said single code may exhibit the same, different, additional, corresponding, supplemental, and/or primary and secondary information to different parties, wherein a manufacturer may have access to information that is different than the information available to a vendor/retailer which may be different than the information available to a consumer. This is addressable through a downloadable application on a mobile device wherein separate and distinct authentication is produced and made available to separate and separable parties wherein said data is either required or desirable to each.

In yet another embodiment, each of the one to a plurality of QR codes may be permanently adhered to an item, article, or product, and/or reversibly adhered to an article wherein. For example, information specific to an article or image may be stitched, sewn, printed, or otherwise adhered to said article, item, or product, and then purchasing information may be fixed to an article, item, or product in the form of a releasable tag or label, wherein the former continues to retain value over the lifespan of the article, item or product and the latter—the releasable—has a finite value leading up to and at time of purchase.

In another embodiment, the present invention may be used to authenticate a specific article thereby avoiding counterfeiting, misbranding, or other product alteration of the above or related items or products as providing traceability and trackability throughout the production and retail chain of custody.

In another embodiment, the present invention may be used to provide supplemental information related to a specific article, item, or product (e.g., identifying materials used in article construction, employment practices, country of manufacture, sourcing and/or actual individual, persons or group of persons responsible for manufacturer). Additionally, data or information may be attainable by an observer or potential consumer related to purchasing an item from an online, retail, or wholesale/brick and mortar outlet.

In another embodiment, an image, symbol, trademark, logo, design, non-fungible token ("NFT"), or other related artwork may be incorporated into said QR code and, by scanning said QR code, information may be derived relating to said image, symbol, trademark, logo, design, NFT, or other related artwork. For example, a QR code, incorporating said image, symbol, trademark, logo, design, NFT, or other artwork, may direct a consumer to a specific webpage address either for additional information or for the ability to purchase said item or article.

In yet another embodiment, the QR code may provide interpreting instructions evidenced and exhibited by said QR code connecting a scanner-enabled mobile smartphone operator to allow access to a specific internet area, social media platform, page, domain, internet address or host server, which provides almost limitless additional or supplemental data or information. For example, the article or item could contain the image or likeness of a historical figure, geographical area, mascot, logo, symbol, trademark, or building for which the QR code would provide information encoded within the QR code related to information, facts and figures specific for the figure, area, mascot or building. In addition, the QR code could provide the consumer purchasing information (as described above).

In another embodiment, a QR code may be placed on or about a piece of art (e.g., a painting or mural) as to provide information about an artist or a particular art piece. In the former, this may be evidenced as a scannable code in a gallery and, in the latter, as a separate format sufficiently flat as to provide a suitable accepting surface for scanning. The is particularly pointed where it is undesirable to place a QR code onto a piece of art, with a portrait or painting, or where the surface is incapable of accepting a QR code directly, in the case of a mural which is typically placed on a pitted or coarse surface (ex. brick, stone and the like).

In another preferred embodiment, the present invention may provide access to a particular venue or area, within the tangible real world or metaverse or alternative reality, whereby scanning the QR code would indicate an authorization (or prohibition) to enter said restricted area. For example, a consumer may purchase a t-shirt that may (or may not) display an image or symbol related to an event (e.g., sporting event or concert). The QR code may, upon scanning, in a particular case, be used to provide: (1) availability to consumers, manufacturing or manufacturer identification, inventory and tracking presale; (2) additional or supplemental information of the event, performer, act or group (including any and all event information and/or person or persons of interest information, fliers, playbills, rosters, lineups, times, dates, locations and the like); (3) authentication that the article is, in fact, genuine; (4) access to the venue or area; (5) access to an additional restricted area within said area; (6) a means to pay for merchandise, food, or drinks once in the venue; (7) a means to track entrants or participants; (8) a coupon, raffle, discount, upgrade, contest winnings, merchandise or other special designation tied to a QR code or later tagged or incorporated into a particular code (through updates on the scanning equipment and accompanying software) as a result of upgrades or contest winning; (9) QR code allows capability for virtual events, virtual concerts and virtual touring abilities; (10) QR code can give the ability to allow music streaming content or services; (11) QR code can give the ability to test out a video/online game or mobile application; and/or (12) QR code can give the ability to access movies (via a movie ticket) and any additional video content (e.g. television programming, YouTube® videos, Tik Tok® videos and the like) pertaining any genre, entertainment or sporting event. Moreover, this same QR code may serve the above stated functions of both additional data or information identifying an article or item, providing information specific to said article or item (e.g., materials utilized in manufacturing, manufacturing process, manufacturing country, manufacturing facility and down to specific manufacturing person or group), tracking and inventory functions, providing identifying or additional information as to a displayed image, information confirming authenticity and the like.

In another embodiment, a QR code may allow a photographer at an event to scan a bar code, link a patron to said event and supply photographs to an attendee. In addition, once a participant has established a link to an event, the attendee may be provided a digital copy of the performance, in audio or video format, evidence of attendance, through a token or other evidence which may be displayed on a social media platform or redeemed through the venue or artists' website, or a discount or coupon related to future events or merchandise, and/or points and credits for future offerings and events (e.g., early release content and ticket notifications, restricted or non-public ticket sales) as a reward for attendance.

In another embodiment, the code itself may act as a "passport" wherein, in addition to information retrieval, information may be conveyed to the scanning party which may be used as a first "check point" for calculating venue attendance, as well as a secondary "check point" for VIP admission. Also, said QR code may be designated as singular to a specific attendee wherein cashless transfers may be accessed, and no physical currency or debit/credit cards need be carried by venue attendees.

In yet another embodiment, the above invention may incorporate an image, symbol, trademark, logo, design or other related artwork within the "bulls-eye" of said QR code, occupying the full "background" of the QR code or a combination thereof.

In another embodiment, QR code can be laid within an artwork, logo, trademark, symbol, diagram, and the like, rather than having the artwork, logo, trademark, symbol, diagram, and the like placed in the center, "bulls eye", of the QR code area.

Yet another preferred embodiment, the present invention may also incorporate an ink outside the visible range, a magnetic ink or RFID tagged technology that may be scannable or "readable" to serve other functions of information or data transference in a redundant, verifying and/or supplemental role to the reading of the QR code.

In another embodiment the present invention may assign a specific code to an individual student in an educational setting wherein an instructor can assign a QR code to each student and monitor, track and assign work to a student—all via the same QR code.

In yet another embodiment, the vaccination status of attendees of an event may be established, recorded, and conveyed as to ensure that proper vaccinations have been received, when those vaccines were received and whether or not subsequent boosters were timely received.

In another embodiment, an event attendee's health status may be recorded on a website-directable QR code wherein, if an attendee has a specific condition, illness or disease, medical personnel can scan the tag of an event attendee and immediately determine that the attendee is, for example, diabetic, suffering from a seizure disorder and/or hypertension.

In another embodiment, an individual's networking event attendance can be recorded, and the information can be used to determine what type of networking events the individual likes to attend—i.e. lunch and learns, dinners, golf outings, meet and greets, happy hours—and then that information can be used to suggest upcoming events. The application can also be applied to industry preference.

In yet another embodiment, the present invention may be used in a B2B (business-to-business) manner, indirectly to consumers, and B2C (business-to-consumer) method, directly to consumers, (and/or C2C, consumer-to-consumer, and/or C2B, consumer-to-business), wherein the above four models may be used to span a broad spectrum from restaurants who are looking to provide an elevated consumer and business experience. For example, music festivals that are looking to expand capacity, add new revenue streams and maximize existing revenue streams and wherein in the B2C model for all aspects involving consumer identification and interaction with a specific brand, group, or organization. Further, C2C transactions may exhibit goods between consumers and C2B where consumers may provide revues or feedback to businesses.

More specifically, in another embodiment, and in the B2B space, given the uncertainty of the construct of the metaverse, the present invention offers an attractive hybrid between a completely virtual model and a traditionally physical model. This offers the ability to allow consumers ease of accessing information and purchasing branded products. Reciprocally, the present invention allows manufacturers and producers of products and content to inform consumers on manufacturing, product sourcing, product history, product mission statements, product availability, product accessibility, product location and the ability to purchase the product, as well as others tools. What is more, the same QR code utilization and system of use can provide information about community outreach, community organization, social consciousness, historical archives and/or activism around a particularized logo or symbol and/or about a depicted person or historical event.

In another embodiment, QR codes may be interspersed within a print, digital, or video format as to provide additional information or supplemental information about a particular subject within text or video. This allows, for example, for an instructional video or documentary to remain on a high level while providing additional information to those consumers requiring or interested in further details or description.

Of note, These particular embodiments disclosed are merely illustrative, which may be apparent to those having skill in the art that may be modified in diverse but equivalent manners. It is therefore contemplated that these particular embodiments may be altered and modified and that all such alterations are considered within the scope and spirit of the present application And while these illustrations are of a limited number set, it is clear that the invention itself is mutable to any number of arrangements, configurations and modifications without departing from the invention's spirit thereof.

I claim:

1. A dynamically curated QR code and a QR code, internet enabled internet-enabled scanner or scanners providing different information to vendors/manufacturers/retailers and consumers, having separate and distinct authentication, for retrieving information, identification, monitoring, tracking and inventorying of a specific item, article or product which also accomplishes the following: allows the scanner operator to object hyperlink to a virtual space via a URL directly, via a mobile application conduit to a URL; enables a retail-operated scanner to derive retail focused information; said information including the source, manufacturer, content and origin of said item, article or product; said information including confirms the identity and authenticity of a particularized item, article or product; allows tracking and tracing of an item, article or product: enables a consumer-operated scanner to derive consumer information; links internet-derived information to a specific article or image, logo, design, or artwork of an item, article or product; provides the retail supplier of an item, article or product; allows the QR code bearer to enter restricted events or spaces; provides the QR code bearer the ability to make purchases, receive discounts, receive coupons; provides the QR code bearer permission to access early release, advanced copy and exclusive content; and/or allows the QR code bearer to access internet live streaming, video messaging, gaming, metaverse or alternative reality, or musical content and/or services, wherein a single QR code contains requisite information to allow object hyperlink to one to a plurality of mobile applications which is accessible by different principals and supplies each one different content, different levels of content, different functionalities, and differing capabilities and accesses.

2. The dynamically curated QR code and a QR code, internet-enabled, retail-operated, consumer-operated, or both, scanners of claim 1 wherein source information may include country of origin, responsible sourcing, facility of manufacture, company of manufacture, group responsible for manufacture, induvial responsible for manufacture, or a combination thereof.

3. The dynamically curated QR code and a QR code, internet-enabled, consumer-operated scanners of claim 1 wherein internet derived information may be related to an article, item or product evidencing a depiction, text, an illustration or illustrations, a diagram or diagrams, image logo, word, word mark, service mark, a symbol or symbols, trademark or trademarks, artwork, or a combination thereof.

4. The dynamically curated QR code and a QR code, internet-enabled, consumer-operated scanners of claim 3 wherein said information related depiction, text, an illustration or illustrations, a diagram or diagrams, image logo, word, word mark, service mark, a symbol or symbols, trademark or trademarks, artwork, or a combination thereof, involves branding in the form of marketing, promotional, advertising, legal, sweepstakes, or contest information, signifiers, or other identifying indicia.

5. The dynamically curated QR code and a QR code, internet enabled scanners of claim 4 wherein said QR code has within its "bulls eye", central region said a depiction, text, an illustration or illustrations, a diagram or diagrams, image logo, word, word mark, service mark, a symbol or symbols, trademark or trademarks, artwork, or a combination thereof.

6. The dynamically curated QR code and a QR code, internet-enabled scanners of claim 1 wherein said principals include, but are not limited to, manufacturers, producers, transporters, consumers, retailers, vendors, event coordinators, venues, or a combination thereof.

7. The dynamically curated QR code and QR code, internet enabled scanners of claim 6 wherein said principals may access different information based upon categorization of information and via access to information through credentialling.

8. The dynamically curated QR code and QR code, internet enabled scanners of claim 7 wherein credentialling may be accomplished through a web address or web page URL.

9. A method for conveying identification information, inventory and purchasing information, authenticity information, supplemental information related to images, symbols, logo, words or other identifying indicia through a single dynamic QR code and object hyperlink to a URL comprising the steps of: adhering a QR to an article, item or product; displaying upon said article, item or product an image, a dynamic QR code or a combination thereof: scanning said QR code; linking said QR code to the internet, either directly through a link to a URL or indirectly through a mobile phone application; and providing information specific to an article, item or product, information specific to an image, information specific to an image within said QR code, or a combination thereof, to either a retail-enabled scanner, a consumer-enabled scanner, or a combination thereof: said information permitted to either said retail-enabled scanner, said consumer-enabled scanner, or both, based on separate and distinct authentications, wherein said QR code contains requisite information to allow object hyperlink to one to a plurality of mobile applications which is accessible by different principals and supplies each one different content, different levels of content, different functionalities, and differing capabilities and accesses.

10. The method for conveying information of claim 9 wherein said article, item or product may have displayed upon said article, item or product a depiction, text, an illustration or illustrations, a diagram or diagrams, image logo, word, word mark, service mark, a symbol or symbols, trademark or trademarks, artwork, a QR code with a "bulls eye" encompassing depiction, text, an illustration or illustrations, a diagram or diagrams, image logo, word, word mark, service mark, a symbol or symbols, trademark or trademarks, artwork, or a combination thereof.

11. The method for conveying information of claim 10 wherein said dynamic QR code may allow for consumer accessing an event or venue, access to an area within an event or venue, accessing discounts, coupons, exclusive content, merchandise, cashless banking access, verification of attendance, or a combination thereof.

12. The method for conveying information of claim 9 wherein linking may achieved through direct linkage to a social media platform, brand website, entertainer website, or a combination thereof.

13. The method for conveying information of claim 9 wherein said QR code may exhibit non-visual forms of identification conveyance which may be magnetic, electromagnetic, radiofrequency, or a combination thereof.

14. The method for conveying information of claim 9 wherein conveyance of information may include details about the wearer in terms of health status, vaccine status, past event attendance.

15. The method for conveying information of claim 9 wherein said QR code may appear within text, video format, or a combination thereof for conveyance of additional information.

* * * * *